Oct. 9, 1923.

1,470,485

G. DE ROUEN

COUPLING CLAMP

Filed Dec. 17, 1921

G. De Rouen, INVENTOR.

BY Geo. P. Kimmel
ATTORNEY.

Patented Oct. 9, 1923.

1,470,485

UNITED STATES PATENT OFFICE.

GUS DE ROUEN, OF ELDORADO, ARKANSAS.

COUPLING CLAMP.

Application filed December 17, 1921. Serial No. 523,111.

*To all whom it may concern:*

Be it known that I, GUS DE ROUEN, a citizen of the United States, residing at Eldorado, in the county of Union and State of Arkansas, have invented certain new and useful Improvements in Coupling Clamps, of which the following is a specification.

This invention relates to pipe clamps and more particularly to leak stoppers for T-couplings.

The object of the invention is to provide means for quickly applying packing to a T-coupling to prevent leakage thereof.

Another object is to provide a clamp of this character composed of a minimum number of parts adapted to be quickly assembled or removed and which will be strong and strain resisting adapting it for the use for which it is intended.

With these and other objects in view, the invention consists in certain novel features of construction as hereinafter shown, described and claimed.

In the accompanying drawings:—

Figure 1:
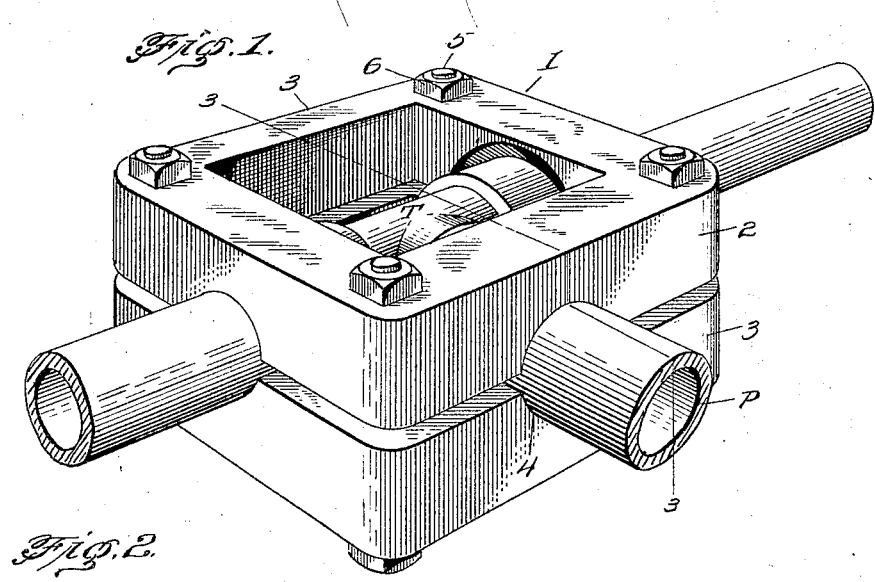
Figure 2:
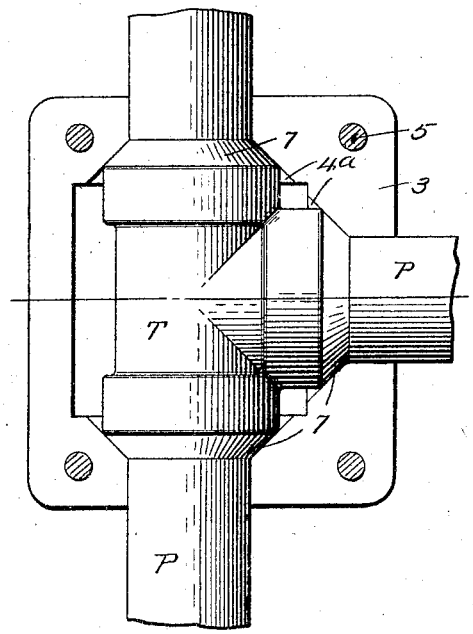
Figure 3:
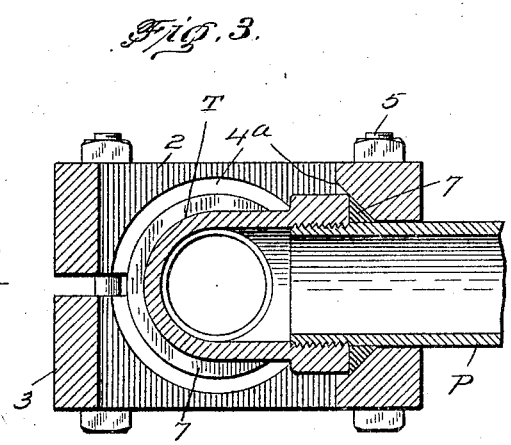

Figure 1 represents a perspective view of a T-coupling connected with a plurality of pipes and with this improved clamp shown applied, Fig. 2 is a plan view with one of the clamping members removed and the connecting bolts shown in section, and, Fig. 3 is a transverse section taken on the line 3—3 of Fig. 1.

In the embodiment illustrated, the clamp 1 constituting this invention is composed of two separably connected superposed members 2 and 3 of the same shape and size and which are here shown in the form of rectangular frames, the meeting faces of which are provided with recesses 4 those in one registering with those in the other to receive the pipes P connected by the coupling T. These recesses 4 are of less depth than the radius of the pipe in connection with which they are to be used so that when the clamp is applied, there will be a space between the opposed or meeting faces of the members 2 and 3, as is shown clearly in Fig. 1.

This provision of the space between these members provides for the drawing together of the members tightly around the pipes and the coupling for a purpose presently to be described.

The members 2 and 3 are provided at their corners with bolt holes, those in one registering with those in the other to receive the bolts 5 which connect the members 2 and 3 and tightly clamp them around the pipes P and the T-coupling T.

The recesses 4 are flared at their inner ends as shown at 4ª to receive packing rings 7 which fit at the junction of the arms of the T-coupling with the pipe P, as is shown clearly in Fig. 3. These packing rings as shown are triangular in cross section with the bases thereof engaged with the inclined or flared portions of the recesses 4 so that when the members 2 and 3 are screwed together, the packings will be tightly forced against the joints between the pipes and the couplings and thereby prevent all possibility of leakage at these points.

The frames or members 2 and 3 are preferably made in the form of castings of desired thickness to insure strength and rigidity adapting the clamp to resist all strains to which it may be subjected. Since the clamp is to be used with a T-coupling, three of the side walls only are recessed to receive the pipe P.

In the use of this clamp the packings 7, which are in the form of split rings of rubber or other suitable material, are first placed at the junction of the coupling T with the pipe P and the bolts are partially removed to permit the separation of the members 2 and 3. Said members are placed in position over the coupling and the pipe as shown in Fig. 1, and the bolts then inserted and the nuts 6 applied. The tightening up of these nuts 6 operates to draw the members 2 and 3 toward each other thereby securely clamping the packings 7 at the joint between the pipes and the coupling and preventing all possibility of leakage at these points.

From the above description, it will be obvious that the members 2 and 3 may be quickly applied to a leaking pipe coupling of the character described to stop leakage at the joints thereof and when so applied may remain indefinitely or until the packings or washers 7 lose their efficiency.

Obviously, a clamp of this character composed of the two castings 2 and 3 and the four bolts 5 may be very cheaply constructed and when used in connection with the packing rings 7 will be thoroughly effective for the purpose intended.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. A clamp of the class described, comprising a pair of like rectangular frames, like pipe-engaging seats through three of the four sides of the frames, said seats flaring toward the inner faces of the walls of the frames, a T-pipe coupling fitted to the three seats, and gaskets surrounding the shanks of the T-coupling and clamped by the flaring seats.

2. A clamp of the class described, comprising a pair of like rectangular frames, like pipe-engaging seats through three of the four sides of the frames, said seats flaring toward the inner faces of the walls of the frames, a T-pipe coupling fitted to the three seats, and gaskets surrounding the shanks of the T-coupling and clamped by the flaring seats and bolts traversing the corner portions of the frames exterior to the seats. couplings and gaskets to clamp the couplings and frames tightly together.

In testimony whereof, I affix my signature hereto.

GUS DE ROUEN.